(12) United States Patent
Park et al.

(10) Patent No.: US 10,118,373 B2
(45) Date of Patent: Nov. 6, 2018

(54) APPARATUS FOR MANUFACTURING DOUBLE-LAYER FABRIC FOR DOWN PRODUCTS HAVING PATTERN JOINING LINE FORMED BY HIGH-FREQUENCY BONDING

(71) Applicant: HOJEON LIMITED, Mapo-gu, Seoul (KR)

(72) Inventors: Young Chul Park, Seoul (KR); Soo Han Chae, Seoul (KR)

( * ) Notice: Subject to any disclaimer, the term of this patent is extended or adjusted under 35 U.S.C. 154(b) by 0 days.

(21) Appl. No.: 15/508,083

(22) PCT Filed: Jul. 1, 2015

(86) PCT No.: PCT/KR2015/006779
§ 371 (c)(1),
(2) Date: Mar. 1, 2017

(87) PCT Pub. No.: WO2016/052840
PCT Pub. Date: Apr. 7, 2016

(65) Prior Publication Data
US 2017/0282528 A1 Oct. 5, 2017

(30) Foreign Application Priority Data

Oct. 1, 2014 (KR) .................. 10-2014-0132529

(51) Int. Cl.
*B29C 65/02* (2006.01)
*B32B 37/06* (2006.01)
(Continued)

(52) U.S. Cl.
CPC ............ *B32B 37/1292* (2013.01); *B32B 5/02* (2013.01); *B32B 7/12* (2013.01); *B32B 37/1045* (2013.01);
(Continued)

(58) Field of Classification Search
CPC ... B32B 7/12; B32B 37/1292; B32B 27/1045; B32B 5/02; B32B 2305/18; B32B 2310/028; D03D 11/00; D06M 17/00
(Continued)

(56) References Cited

U.S. PATENT DOCUMENTS 6,158,366 A 12/2000 Codos
2017/0280802 A1 10/2017 Park et al.

FOREIGN PATENT DOCUMENTS

CA 2329526 A1 11/1999
CN 1299423 A 6/2001
(Continued)

OTHER PUBLICATIONS

International Search Report for PCT Application No. PCT/KR2015/006779, dated Jul. 24, 2015. pp. 1-2.
(Continued)

*Primary Examiner* — Sonya Mazumdar
(74) *Attorney, Agent, or Firm* — Haynes and Boone, LLP

(57) ABSTRACT

A device for preparation of double fabric for down products comprises a printing means that can print an adhesive in a predetermined printing pattern on fabric; a drying means that can dry or fix the adhesive; a laminating means that can stack and laminate the fabrics on which an adhesive is printed; and a bonding means that can bond the fabrics with a cured adhesive by pressing with a predetermined pressing means and high-frequency heating to cure the adhesive; wherein said printing pattern and the pressing pattern are the same in pattern (shape), can be overlapped on the basis of the center line and have a difference in size (width) of 20% or less. Consequently, double fabric for down products thus manufactured has an excellent adhesiveness and durability and an aesthetically excellent pattern line with good clearness and finishing quality.

12 Claims, 9 Drawing Sheets

(51) Int. Cl.
  *B32B 37/10* (2006.01)
  *B32B 38/14* (2006.01)
  *B32B 37/12* (2006.01)
  *D03D 11/00* (2006.01)
  *D06M 17/00* (2006.01)
  *B32B 5/02* (2006.01)
  *B32B 7/12* (2006.01)

(52) U.S. Cl.
  CPC .............. *D03D 11/00* (2013.01); *D06M 17/00* (2013.01); *B32B 2305/18* (2013.01); *B32B 2310/028* (2013.01)

(58) Field of Classification Search
  USPC .................. 156/184, 277, 387, 388, 553
  See application file for complete search history.

(56) References Cited

FOREIGN PATENT DOCUMENTS

| | | |
|---|---|---|
| CN | 201076039 Y | 6/2008 |
| EP | 3202274 A1 | 8/2017 |
| EP | 3202973 A1 | 8/2017 |
| JP | 58-184518 U | 12/1983 |
| JP | H0654706 B2 | 7/1994 |
| JP | 3037948 B1 | 5/2000 |
| JP | 2000328462 A | 11/2000 |
| KR | 20020001239 A | 1/2002 |
| KR | 200434829 Y1 | 12/2006 |
| WO | 2016052839 A1 | 4/2016 |
| WO | 2016052840 A1 | 4/2016 |

OTHER PUBLICATIONS

Written Opinion for PCT Application No. PCT/KR2015/006779, dated Jul. 24, 2015. pp. 1-5.

Second Office Action for CN Application No. 201580002773.6, dated Feb. 13, 2017, pp. 1-6.

Second Notification of Office Action for CN Application No. 201580002773.6, dated Feb. 20, 2017, pp. 1-5.

Notice of Allowance for JP Application No. 2016-526166, date unknown, pp. 1-3.

Notice of Allowance for KR Application No. 9-5-2015-024529914, dated Apr. 13, 2015, p. 1.

APPARATUS FOR MANUFACTURING DOUBLE-LAYER FABRIC FOR DOWN PRODUCTS HAVING PATTERN JOINING LINE FORMED BY HIGH-FREQUENCY BONDING

PRIORITY CLAIM

This application is a 371 national stage application of International Patent Application No. PCT/KR2015/006779 filed Jul. 1, 2015, which claims priority to Korean Patent Application No. KR 10-2014-0132529 filed Oct. 1, 2014, which are incorporated herein by reference in their entirety as part of the present disclosure.

TECHNICAL FIELD

Embodiments of the present invention relates to a device for the preparation of a double fabric for down products having at least one bonding pattern line formed by a high-frequency bonding technique, which comprises a printing means, a drying means, a laminating means and a combining means, more specifically, a device for the preparation of a double fabric for down products having at least one bonding pattern line formed by a high-frequency bonding technique, which is characterized in that it is provided with a printing means carved with a predetermined printing pattern and a high-frequency heating means having a predetermined pressing pattern and that said printing pattern and said pressing pattern are the same.

BACKGROUND ART

Down products filled with insulating materials such as duck down or goose down are used not only for cold weather clothing and bedding, but recently they are also taking center stage as products for outdoor clothing or the like.

As to clothing or bedding products prepared by incorporating a wadding material between an outer fabric and an inner fabric, the incorporated wadding material may generate phenomena such as getting lumpy, moving around, getting stacked or the like while manufacturing or utilizing the products, which may cause various inconveniences. When the wadding material is a fabric such as a cloth, the above phenomena can be prevented by fixing the edge of the wadding material to the edge of the product. When the wadding material is a continuous material such as cotton or wool, the wadding material can be prevented from moving or getting lumpy by sewing the inner fabric and outer fabric together with the wadding material therebetween by backstitching or quilting.

When the wadding material is a non-continuous material such as duck feathers or goose feathers, it is difficult to fix the wadding material by backstitching or quilting. Therefore, the wadding material is prevented from moving or getting lumpy by means of separate room such as down compartments formed between the inner fabric and the outer fabric.

A down compartment is generally formed by connecting an inner fabric and an outer fabric with combining or bonding lines for separating a compartment, and the compartments (rooms) formed by the inner fabric, the outer fabric and the combining lines are filled with down (down feather). For example, in a down jacket, sewing line compartment walls formed at a certain interval by sewing the inner fabric together with the outer fabric, and then the opened ends of the inner fabric and outer fabric are subjected to an overlock finishing to form spatially closed down compartments.

Down products having the above down compartments can prevent down from moving around or moving back, but still have other problems such as, first, an exudation of down and an introduction of moisture through the fabric itself, second, an exudation of down and an introduction of moisture through sewing holes or needle holes, and third, an increase of manufacturing cost due to the additional sewing processes for forming down compartments.

Recently, there have been proposed many seamless method of preventing down feathers from being escaping or rain water from introducing by forming a down compartment via non-sewing manners such as a fusion manner of surfaces themselves or a fabric bonding manner using an adhesive or a hot melt. However, these seamless methods cannot be applied to a real production owing to the problems such as an insufficient bonding strength of the compartment-separating line formed by a fusion or bonding, a damage of the fabrics or a poor finishing quality of the pattern line on the fabric surface.

For example, Korean Utility Model Application No. 20-2006-0022001 suggests a method for preparing a duck feather cloth wherein a double fabric is firstly prepared by introducing the adhesive in a wave shape between an inner fabric and an outer fabric to form a wave-shaped adhesive part and then the obtained double fabric is cut and sewed in a desired shape and pattern to prepare a duck feather cloth, and a manufacturing device of the double fabric which comprises an adhering device part, a bonding device part and a drying device part. Although this document discloses a manufacturing device of a double fabric for down products through a pre-combining post-cutting manner not through an existing pre-cutting post-combining manner, it has problems such that, first, the adhesive may be smeared or transferred since an inner fabric on which an adhesive is attached is laminated with an outer fabric without drying the adhesive, second, the adhesion strength may be deficient since the bonding is achieved simply by contacting and laminating an inner fabric with an outer fabric and then drying the laminate fabrics, and third, any pattern line is rarely formed on the surface of the fabrics.

Meanwhile, Japanese Patent Laid-Open No. 2000-328462 discloses a technology and device wherein a liquid adhesive is injected via an injection needle between an inner fabric and an outer fabric and then a high-frequency heating and pressing method is performed to together bond the inner fabric, the intermediate matters and the outer fabric and simultaneously to inlay a quilting pattern on the surface. In this document, the liquid adhesive is injected into the intermediate matter and then subjected to a high-frequency heating and pressing method without any drying to bond the inner fabric-intermediate matter-outer fabric. As a result, it is possible to clearly form on the surface a pattern which is the same with that of the pattern of a pressing tip. However, there is generated a problem that the adhesion state is variable and not uniform. In other word, when an inner fabric and an outer fabric are bonded by the technology described in said document, it is possible to have a predetermined pattern on a surface. However, since the liquid adhesive introduced into the inside can spread around during the pressing, the finishing of the adhering line would be very poor and uneven, as well as the needle holes created when injecting the adhesive may cause a damage to fabric and a penetration of moisture.

Under such circumstances, the inventors of the embodiments of the present invention understood that it is difficult or impractical to execute real production according to the existing methods of forming down compartments by a sewing method, a fusion method or a bonding method according to the known technologies since they have problems that needle holes are created to cause an exudation of feathers or an invasion of rain water; that fabrics may be damaged by sewing or fusing; that bonding or combining lines between fabrics are deficient in the bonding strength and durability; and that bonding pattern lines on the surface of fabrics are not clear or poor in its finish quality. As a result, the inventors has tried to develop a new manufacturing method of down products which can solve or does not have such disadvantages or problems, especially a new method of down products having bonding pattern lines for separating compartments, wherein the bonding line for compartment separation inside the fabrics has an excellent adhesiveness and durability, and the pattern line on the fabric surface is clear and its finishing quality is excellent, and thus is aesthetically excellent.

As a result, by coating or printing an adhesive liquid in a predetermined printing pattern in a printing manner, drying the adhesive liquid to an appropriate level and then combining the fabrics under pressing by a high-frequency heating manner, the present inventors could manufacture a down product which has bonding lines for compartment separation between fabrics and has pattern lines at the same position with the bonding lines on the surface of the fabrics, without forming sewing holes and without causing any damage to the fabric, wherein the inner bonding line has an excellent adhesiveness and durability, the surface pattern line is clear and its finishing quality is excellent.

SUMMARY OF THE INVENTION

Technical Subject

The present inventors tried to develop a device which can manufacture a double fabric for down products having at least one bonding pattern line formed by a high-frequency bonding method through a pre-bonding post cutting manner.

Means for Achieving the Subject

The present inventors have developed a device for the preparation of a double fabric for down products which can form a pattern bonding line by a high-frequency bonding method and comprises a printing means, a drying means, a laminating means and a bonding means as follows:
 a printing means which is carved with a predetermined printing pattern and which can print an adhesive in said printing pattern on fabric;
 a drying means which can dry or fix the adhesive so that the adhesive printed on the fabric is not transferred during a laminating process;
 a laminating means which can stack and laminate the fabrics on which an adhesive is printed; and
 a bonding means which is provided with a pressing means on which a protrusion having a predetermined pressing pattern is formed and which can bond fabrics with the adhesive by pressing with said pressing means and high-frequency heating to cure the adhesive; wherein said printing pattern and the pressing pattern are the same in pattern (shape), can be overlapped on the basis of the center line and have a difference in size (width) of 20% or less.

Effect of the Invention

The device of the present invention can allow a mass production of a double fabric for down products having down compartments by means of a high-frequency heating and pressing method and/or a pre-bonding post-cutting manner and thus prepared double fabric for down products has bonding lines which have an excellent adhesiveness and durability and surface pattern lines which are clear and its finishing quality is excellent.

EMBODIMENTS FOR CARRYING OUT THE INVENTION

The first purpose of the embodiments of the present invention is to provide a device for the preparation of a double fabric for down products through a pre-bonding post-cutting manner which firstly forms a compartment for storing down and then secondly perform a cutting, which can be achieved a device comprising a printing means, a drying means, a laminating means and a bonding means as follows:
 a printing means which can print an adhesive in said printing pattern on fabric by using a printing apparatus having a predetermined printing pattern;
 a drying means which can dry the adhesive from the fabric on which the adhesive has been printed;

a laminating means which can stack and laminate the fabrics on which an adhesive has been printed and dried; and a bonding means which can bond fabrics with the adhesive by pressing and heating the fabric on which the adhesive has been printed and fixed to proceed a curing reaction of the adhesive;

provided that, said printing pattern and the pressing pattern are the same in patter (shape), can be overlapped on the basis of the venter line and have a difference in size (width) of 20% or less.

In the context of the embodiments of the present invention, the printing pattern is a pattern which is formed or carved on a printing apparatus and also is a pattern which is printed on a fabric. The pressing pattern is a pattern of a protrusion part which is formed or protruded on a high-frequency bonding means and also is a pattern which is formed on the surface of a fabric during a hating and pressing.

Hereinafter, the embodiments of the present invention is explained in more detail.

Figure 1:
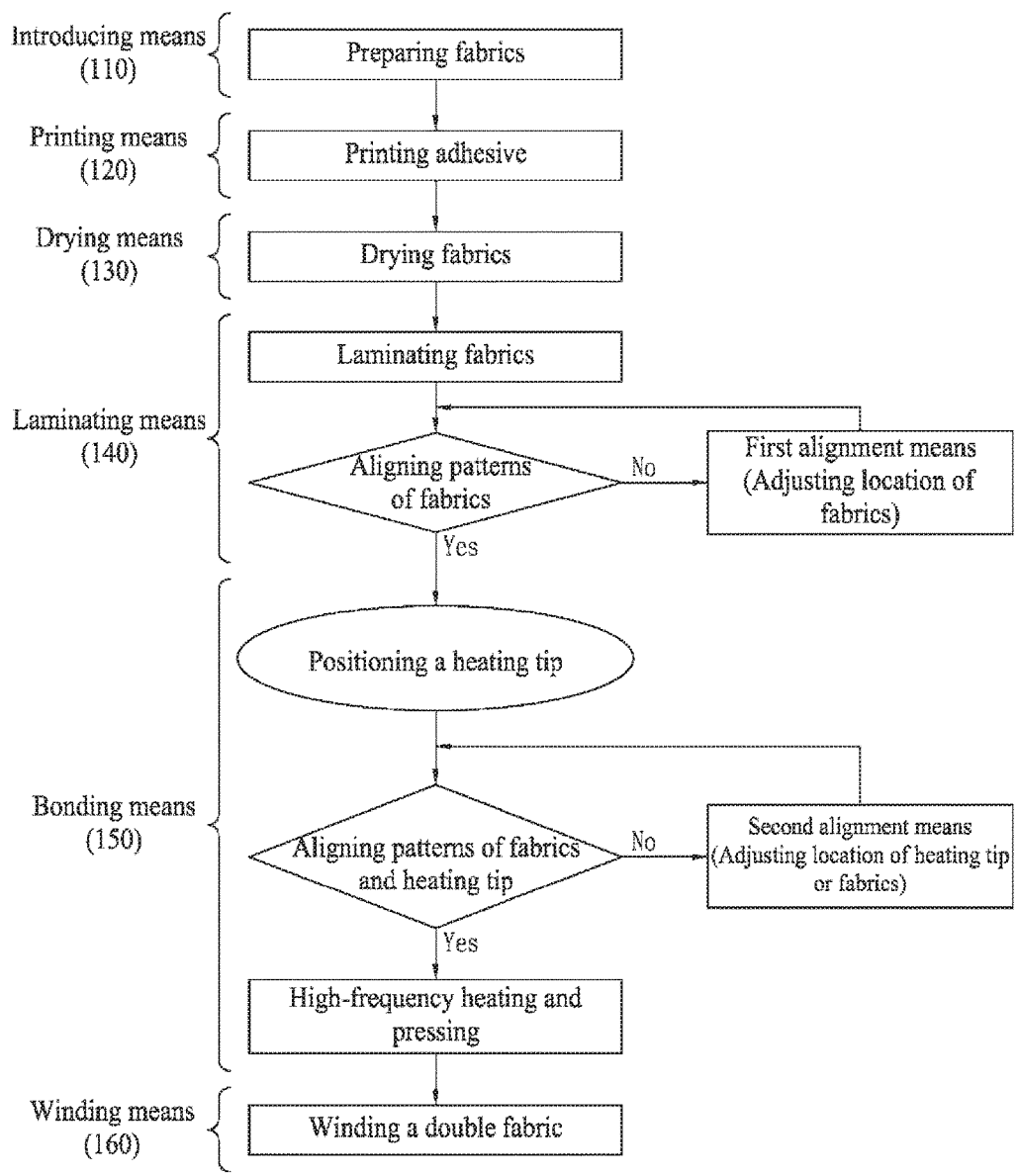
FIG. 1 is a drawing illustrating the order for manufacturing a double fabric for down products having down compartments.
Figure 2:
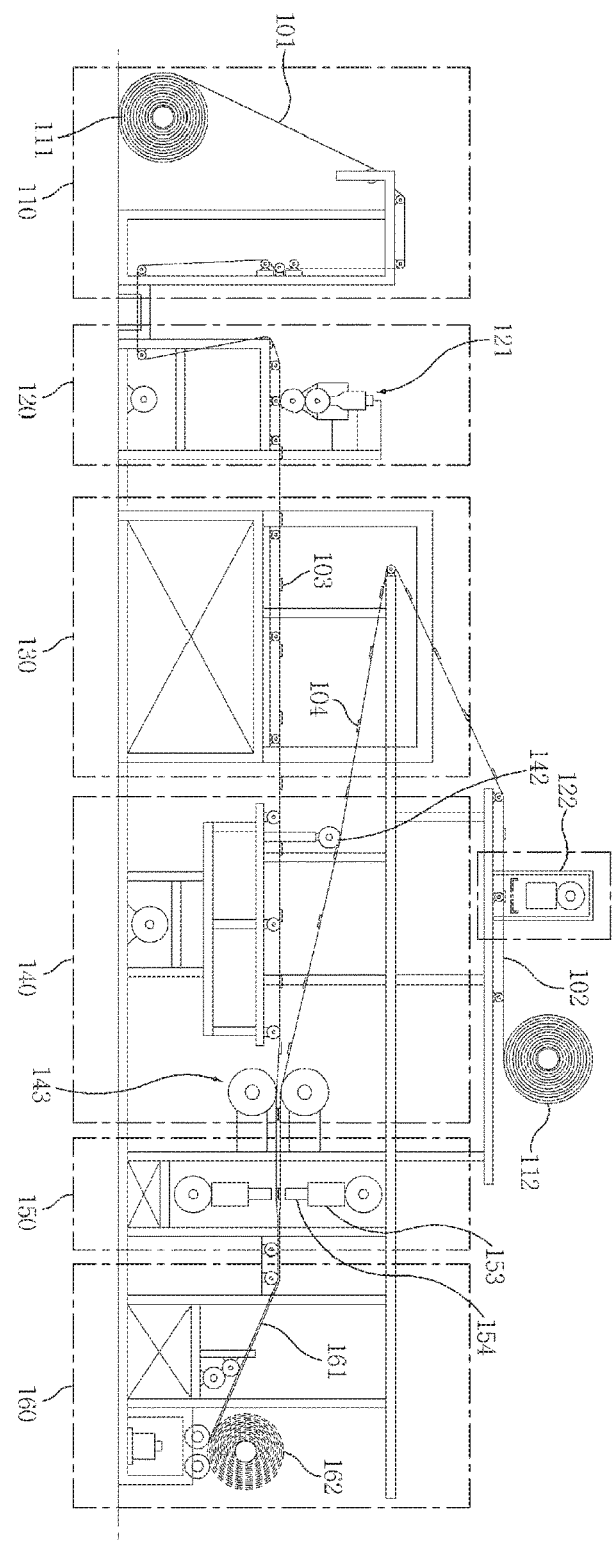
FIG. 2 is a drawing illustrating a device for manufacturing a double fabric according to the present invention.

FIG. 1 is a drawing illustrating the processes and its order for manufacturing a double fabric for down products according to the embodiments of the present invention, and FIG. 2 is a drawing illustrating a linking relation of each means that constitute a manufacturing device according to the embodiments of the present invention.

As illustrated in FIG. 2, the manufacturing device of the embodiments of the present invention typically comprises an introducing means (110), a printing means (120), a drying means (130), a laminating means (140), a bonding means (150), and a winding means (160). The role and/or function of each means are described as follows:

The introducing means (110) means a device which can connect an inner fabric roll (111) and an outer fabric roll (112) to the introducing part of a conveyer-type processing line or a roller-type processing line so that fabrics can be continuously furnished into the process line.

The printing means (120) is a device for printing an adhesive on a fabric in a predetermined printing pattern, and can be selected from a stamping printing means, a pressing press printing means, a roller printing means, a screen printing means, or the like. A printing pattern is carved or embossed, preferably carved on the stamp, the press or the roller, or the printing pattern is written on the screen. The printing means can be respectively and separately installed with respect to the first fabric (outer fabric) and second fabric (inner fabric), both of which constitute a double fabric, since the adhesive may be printed on either or both of the first fabric and the second fabric. FIG. 2 illustrates a roller printing manner as the printing means (121) for the inner fabric and a screen printing manner as the printing means (122) for the outer fabric.

In addition, an adhesive (103) printed on an inner fabric and an adhesive (104) printed on an outer fabric are illustrated as being printed on the upper-facing surface of the inner fabric (101) and outer fabric (102) which are horizontally conveyed. However, such illustration is made only for a convenience, and the adhesive liquid may be printed on the lower-facing surface of a fabric or on a fabric which vertically or inclinedly moves or is conveyed, if necessary. In such case, it would be preferable for the adhesive liquid to have a viscosity to an extent not to flow down.

Figure 4:
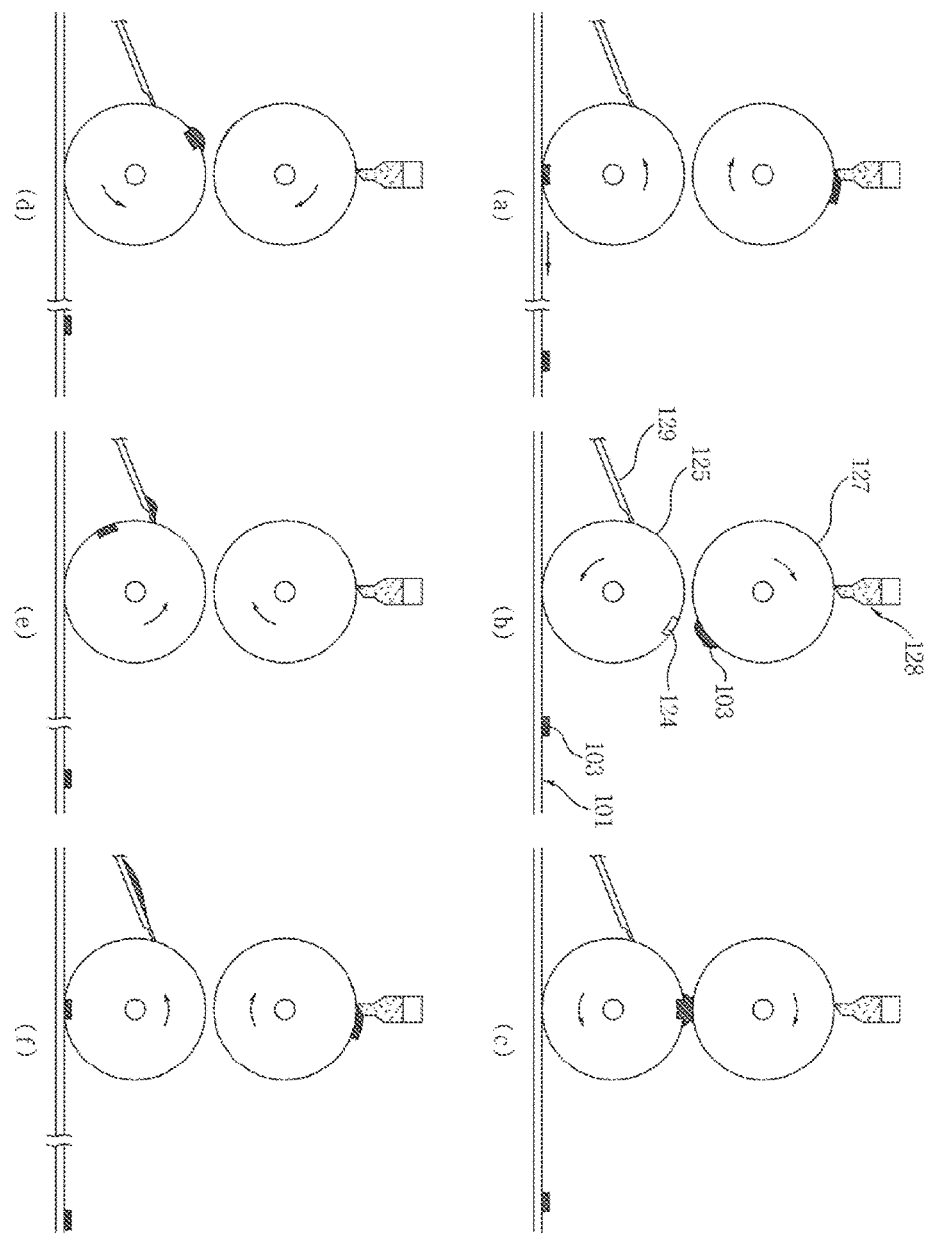
FIG. 4 is a drawing illustrating the order for printing an adhesive on a fabric by a roller printing technology.

FIG. 4 illustrates a printing method employing a roller printing device (121) as the printing device for an inner fabric. As illustrated in FIG. 4, the roller printing device (121) basically comprises an adhesive liquid supplier (128), a release roller (127), a main roller (125) and a guide knife (129). An adhesive liquid (103) is supplied from the adhesive liquid container (128) to the release roller (127) [see Drawing (a)], and then delivered to a groove (124) of the main roller (125) carved with a printing pattern [see Drawings. (b) and (c)]. The adhesive liquid delivered to the groove (125) of the main roller is transferred to the fabric surface when being in contact with the fabric [see Drawings. (d), (e) and (f)]. The adhesive liquid (103) printed on the fabric is dried at a subsequent drying device and then fixed on the fabric. The roller printing device (121) may further comprise a guide knife (129) for removing ink which has been transferred outside of the groove (124) (concave part of the printing pattern) of the main roller.

A screen printing device (122) is illustrated in FIG. 2 as a printing device for outer fabric, and such screen printing device (122) may comprise an adhesive liquid supplier, a screen, and a brush. In such screen printing device, an adhesive liquid is supplied from an adhesive liquid supplier to a screen, and the screen is in contact with the fabric and then brushed with a brush to coat the adhesive liquid on a fabric along the pattern written on the screen. Thus coated adhesive liquid (104) can be dried at a subsequent drying device (130) to be fixed on the fabric.

At the drying means (130), the adhesive liquid printed on a fabric is dried. The adhesive should be attached on a fabric by being dried or solidified to a proper level so that the adhesive is not transferred or its pattern is not scattered when carrying out a laminating. In the drying step, the viscosity of the adhesive liquid adhered to the fabric surface can be decreased due to a high drying temperature, and thus the adhesive liquid can permeate into the fabric and can be solidified therein. The inner fabric and the outer fabric may be dried at the same or different drying means. FIG. 2 illustrates that the drying of the inner fabric and the drying of the outer fabric are carried out in the same drying means, but is given only as an example and the embodiments of the present invention is not limited thereto. Drying can be carried out by heating, air blast, UV irradiation, or a combination thereof, but any heating element (e.g. heating filament), ventilator and luminous body or the like for this is are not specifically illustrated in FIG. 2. According to a preferable embodiment of the present invention, the drying means can be selected from a tenter.

The laminating means (140) is a means that laminates fabrics by closely contacting an inner fabric with an outer fabric. For example, the inner fabric is closely contacted and laminated with the outer fabric so that the printing pattern of the inner fabric is contacted and coincided with the printing pattern of the outer fabric.

The above laminating means may further comprise a first alignment means (a means for adjusting the fabric location) for aligning the printing pattern of the inner fabric to be coincided with the printing pattern of the outer fabric during the process of closely contacting and laminating a first fabric (or a lower fabric or an inner fabric) and a second fabric (or an upper fabric or an outer fabric). In the embodiments of the present invention, the location alignment for coinciding the printing pattern of an inner fabric with the printing pattern of an outer fabric can be achieved by adjusting the fabric location and/or the conveying speed. As such means, mention can be made on a variable roller means (142), a fabric speed controlling means or the like. The variable roller (142) is in contact with the fabric at the fabric convey path, and the fabric path can be changed by moving the position up and down. By this, the relative locations of the adhesives attached to the inner fabric and the outer fabric can be adjusted.

In general, the adjustment of the fabric delivery speed can be achieved by adjusting the speed of the printing process, the drying process or the like. In such case, however, a problem may be generated that it is required to adjust the delivery speed of fabric throughout the process line. Therefore, it can be easier or more efficient to align the location of the fabric by adjusting the delivery path rather than controlling the delivery speed.

The operation of the first alignment means employing a variable roller (142) can be explained as follows. For example, when an adhesive (103) attached to an inner fabric (101) is introduced into a laminating device slightly behind an adhesive (104) attached to an outer fabric (102), the moving speed of the outer fabric (102) can be slightly slowed down as a whole. Alternatively, the variable roller (142) located on the delivery path of the outer fabric can be moved upwardly to make the delivery path of the outer fabric (102) longer, and thereby the location of the adhesive (104) of the outer fabric can be adjusted backward. As a result, the pattern of the inner fabric and the pattern of the outer fabric can coincide with each other.

The first alignment means (the means for adjusting the fabric location) may further comprise, for example, a means for measuring the relative locations of adhesives attached to the inner fabric and outer fabric, and a means for adjusting the fabric delivery speed or fabric delivery path so that the relative locations are consistent or coincided. By controlling the means for measuring the relative locations in relation with means that can adjust a fabric delivery speed and/or a fabric delivery path, it is possible to perform more accurately as well as to automate the above alignment process.

The bonding means (150) is a means that can press fabrics and cure the adhesive with a high-frequency heating to combine the fabrics, and can be operated by utilizing a pressing press means or a roller pressing means which has, on the surface, a pressing protrusion or a pressing tip formed with a predetermined pressing pattern.

At the bonding means (150), said protrusion and said laminated fabrics are located so as to coincide the pressing pattern of the protrusion with is coincided with the printing pattern of the laminated fabrics, and the protrusion is moved toward the fabrics to press the fabrics, and simultaneously the adhesive is cured with a high-frequency heating to bond the fabrics.

According to a preferable embodiment of the present invention, the bonding means (150) may comprise a second alignment means (not shown) which can adjust the location of the fabrics and/or the protrusion so that the printing pattern of the adhesive is coincided with the pressing pattern of the protrusion. The second alignment means can adjust the location of the adhesive printed on fabrics or the location of the pressing tip to control their relative positions, and for this purpose, may comprise a means of controlling a delivery speed of laminated fabrics, a position of the protrusion, a roller speed or the like.

The location of the printing pattern of laminated fabrics can be precisely adjusted in a fine scale by controlling the position of fabrics by a variable roller (not shown) or by controlling a delivery speed of fabrics. The controlling of a delivery speed of laminated fabrics causes a problem that requires a change of the delivery speed of laminated fabrics throughout the entire process line. Thus, it is easier to control the location of the printing pattern of laminated fabrics by changing the location of the fabric laminated by a variable roller.

Meanwhile, the matching or coinciding of the printing pattern with the pressing pattern can be achieved by controlling the position of the pressing pattern. The position of the pressing pattern, specifically, the position of the pressing tip or protrusion of the pressing roller or press can be controlled by changing their operation speed (i.e., the rotation speed of a roller or the pressing speed of a press), or their positions (e.g., height). It may be easiest or most efficient to control the operation speed and/or location of a roller or press. Therefore, the purpose of the second alignment means which can align the fabrics and the pressing tip so that the printing pattern is coincided with the pressing pattern can be achieved by manners of controlling the location of fabric, the location of pressing tip, the delivery speed of fabric, the operating speed of pressing tip, or the like. Preferably, it can be achieved by controlling the location or operation speed of the pressing tip.

The above second alignment means may comprise a device of measuring the location of an adhesive and/or a device of controlling the location of a heating tip. By together controlling them with a computer, the above alignment process can be more precisely performed, and further, can be automated.

The above first alignment means and the second alignment means can employ a technique and device which are similar to those used in a printing technology wherein two or more colors are printed, for example, a three-color printing technique in which three colors are separately printed, or a four-color printing technique in which four colors are separately printed.

According to an embodiment of the present invention, the printing pattern and the pressing pattern can be overlap with each other with respect to the pattern (shape) on the basis of the center line of the patterns, as well as the difference in size (width) of both is 20% or less, and preferably 10% or less.

The winding means (160) generally refers to a means that can wind in the form of a roll (162) a double fabric (161) which is continuously manufactured and then optionally subjected to a cooling step. However, the form is not necessarily limited to a winding roll, and it can be collected in any form suitable for delivery. The double fabric prepared in the bonding process is collected as it is or in the form of a roll or something else, and then may be immediately delivered to the subsequent processes of manufacturing down product, for example, to marking and cutting processes.

Meanwhile, the process of manufacturing a double fabric for preparing down products at the preparation device shown in FIG. 2 can be explained in order as shown below, starting from the inner fabric and the outer fabric.

The inner fabric (101) is unwound from the inner fabric roll (111) installed at the introducing means (110) and then conveyed to a printing means (120). An inner fabric printing device (121) of the printing means (120) is illustrated with a roller printing technique in FIG. 2 and prints an adhesive liquid (103) in a predetermined printing pattern on the inside surface of the conveyed inner fabric (101). The inner fabric (101) printed with an adhesive liquid (103) is conveyed to the drying means (130) such as a tenter and dried at a predetermined temperature for a predetermined time.

In addition, the outer fabric (102) is unwound from the outer fabric roll (112) installed at the introducing means (110) and then conveyed to a subsequent process. When the outer fabric (102) is not printed with an adhesive, it is directly conveyed to a drying process or to a laminating process. When the outer fabric (102) is printed with an adhesive liquid, the adhesive liquid is printed in a predetermined pattern, preferably in the same pattern with that of the inner fabric on the inside surface of the outer fabric (102) unwound from the outer fabric roll (112) by using an outer fabric printing means (122). The above outer fabric printing device (122) is illustrated with a screen printing technique in FIG. 2, but other printing means, for example, a roller, a press can be employed. The outer fabric (102) printed with an adhesive liquid (104) is conveyed to the drying means (130) such as a tenter and dried at a predetermined temperature for a predetermined time.

The inner fabric (101) on which an adhesive liquid (103) is printed and dried and/or the outer fabric (102) on which an adhesive liquid (104) is printed and dried are separately delivered to a laminating means (140) and then laminated so that the printing pattern of the adhesive (103) is coincided with the printing pattern of the adhesive liquid (104). If there is a difference in the locations of printing patterns and thus they do not coincide with each other, the difference in printing pattern can be controlled by adjusting the delivery speed of fabrics, or by controlling the delivery distance of the outer fabric using a delivery roller (142).

The double fabric (161) can be manufactured by laminating the inner fabric (101) and outer fabric (102) so that their printing patterns are coincided with each other, conveying the laminated fabrics to a high frequency bonding means (150) and carrying out a high frequency heating while pressing the fabrics with the pressing tip (154) of the high frequency bonding device (153) at the area of the printing pattern, thereby to bond the inner fabric and outer fabric with a bonding line originated from the adhesive. Thus manufactured double fabric (161) is wound to form a double fabric winding roll (162).

Figure 3:
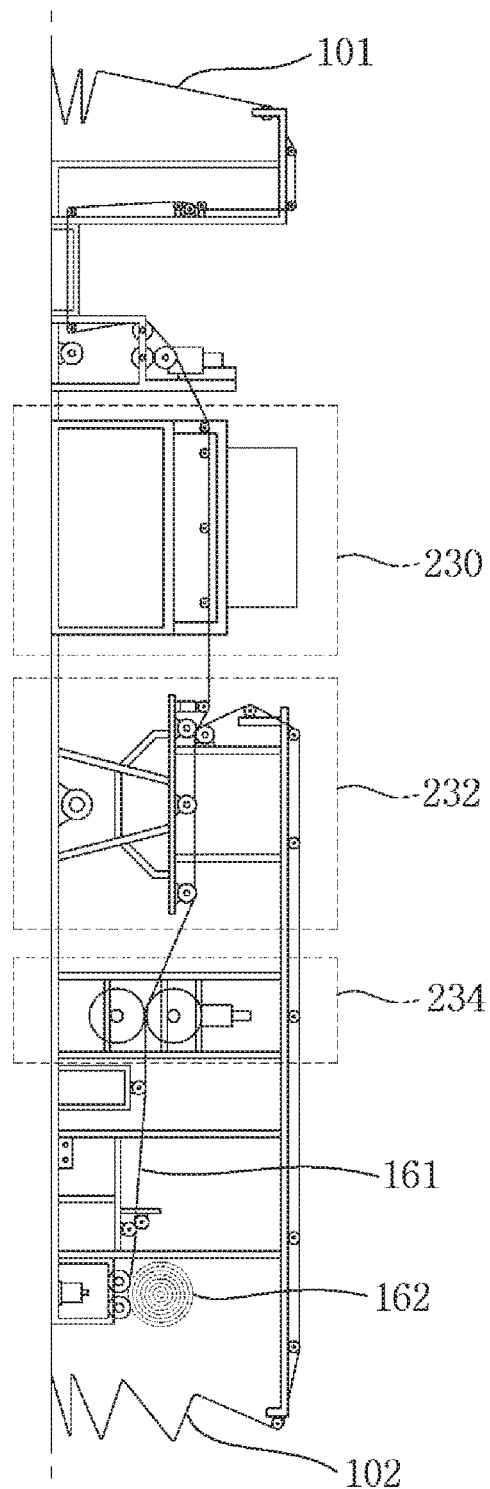
FIG. 3 is a drawing illustrating a device for manufacturing a double fabric according to a prior art.

FIG. 3 is a drawing showing a manufacturing device of a double fabric for down products as illustrated in a prior art (Korean Utility Model Application No. 20-2006-0022001), which comprises an adhering device part (230), a bonding device part (232) and a drying device part (234). An inner fabric (101) which can be used as an inner fabric of a down product is conveyed and supplied into the adhering device part (230), wherein an adhesive is applied onto the fabric by an adhesive injector (not shown). The adhesive injector is mounted so that it injects an adhesive with back and forth moving in a zigzag shape to apply an adhesive in a zigzag wave shape. The inner fabric (101) on which an adhesive has been applied at the adhering device part (230) is conveyed to the bonding device part (232), and an outer fabric (102) which can be used as an inner fabric of a down product is also supplied together from an upper part of the bonding device part (232), wherein the inner fabric (101) to which an adhesive is applied and the outer fabric (102) supplied from an upper part are laminated. The laminated fabrics are supplied together into the drying device part (234), wherein the inner fabric and the outer fabric are bonded to form a double fabric (161). The resulted double fabric (161) passes through the drying device part (234) and then is finally wounded to obtain a form of a winding roll (162).

Considering the manufacturing device shown in FIG. 3 and the prior technology using the device, it can be noted that, first it does not have such concept to coincide a printing pattern and a pressing pattern, second, the manner of applying an adhesive is different from the embodiment of the present invention, third, the type of an adhesive is different from the embodiment of the present invention, and forth, the order of the drying step and the pressing-heating step is different from the embodiment of the present invention.

Meanwhile, FIG. 4 is a drawing illustrating a printing procedure of an adhesive liquid on fabrics along its sequence order by using a roller printing device (121), wherein the roller printing device (121) basically comprises a supplier (128) of an adhesive liquid, a release roller (127) and a guide knife (129). In the drawing, the adhesive liquid (103) is furnished from a container (128) of an adhesive liquid to the release roller (127) [see Drawing (a)], and subsequently delivered to a groove (124) of a main roller (125) on which a printing pattern is carved [see Drawings (b) and (c)], and the adhesive liquid thus delivered to the groove (124) of the main roller (125) is transferred on the fabric surface when contacted with the fabric [see Drawings (d), (e) and (f)]. The adhesive liquid thus printed on the fabric is dried at a following drying device to be fixed on the fabric. The roller printing device (121) may further comprise a guide knife (129) in order to remove ink attached out of the groove (124) of the main roller.

Figure 5A:
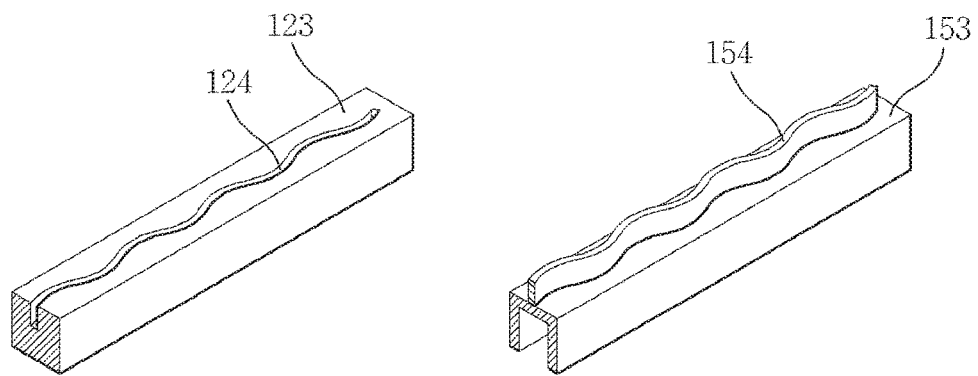
FIG. 5a is a drawing illustrating a press for printing in which a printing pattern is and a press for pressing in which a corresponding pressing pattern is protruded.
Figure 5B:
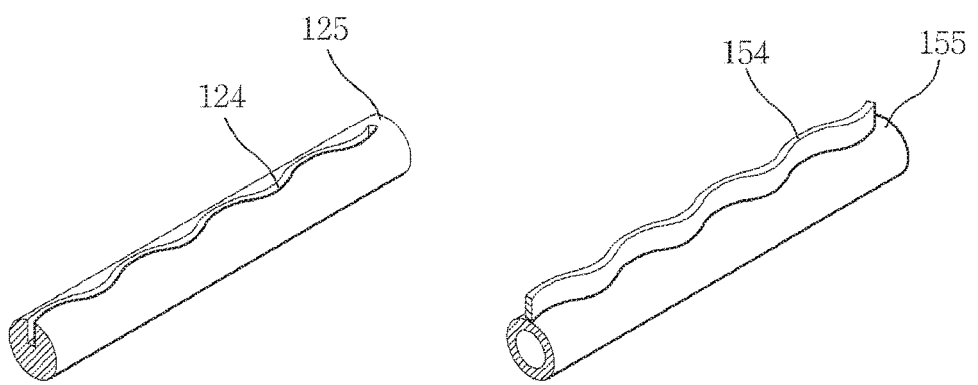
FIG. 5b is a drawing illustrating a roller for printing in which a printing pattern is carved and a roller for pressing in which a corresponding pressing pattern is protruded.

FIG. 5a is a drawing illustrating a press (123) used in the printing means (130) and having grooves (124) carved in a predetermined printing pattern, and a press (154) used in the high frequency bonding means (150) and having a protrusion (154) formed in the same pressing pattern as the printing pattern. FIG. 5b is a drawing illustrating the case where the printing means and bonding means in FIG. 5a have a roller, not a press. It shows a roller (125) carved with a groove (124) in a predetermined printing pattern and a roller (152) embossed with a protrusion (153) in the same pressing pattern as the printing pattern. In said press (123) and roller (125), the slanting portion on the left means a cut section, and the carved groove (124) may be closed (FIGS. 11a and 11b) or open at their both ends.

In FIGS. 5a and 5b, the printing pattern of a concaved groove (124) and the pressing pattern of a protruded pressing tip (154) are the same in shape and size. Specifically, the pattern (shape) may overlap each other with respect to the pattern center line, and the difference in size (width) is 20% or less, and preferably 10% or less. The depth of the groove (124) and the height of the pressing tip (154) do not correspond to each other, and may be selected independently. For example, the groove (124) can have a depth of generally 0.5~5 mm, and preferably 1~3 mm and a width of 1~10 mm, and the pressing tip (154) can have a height of 1~30 mm, and preferably from 5~20 mm and a depth of 1~10 mm. Meanwhile, when the printing means is a printing screen, the pattern may have a width of generally 1~10 mm.

Figure 6:
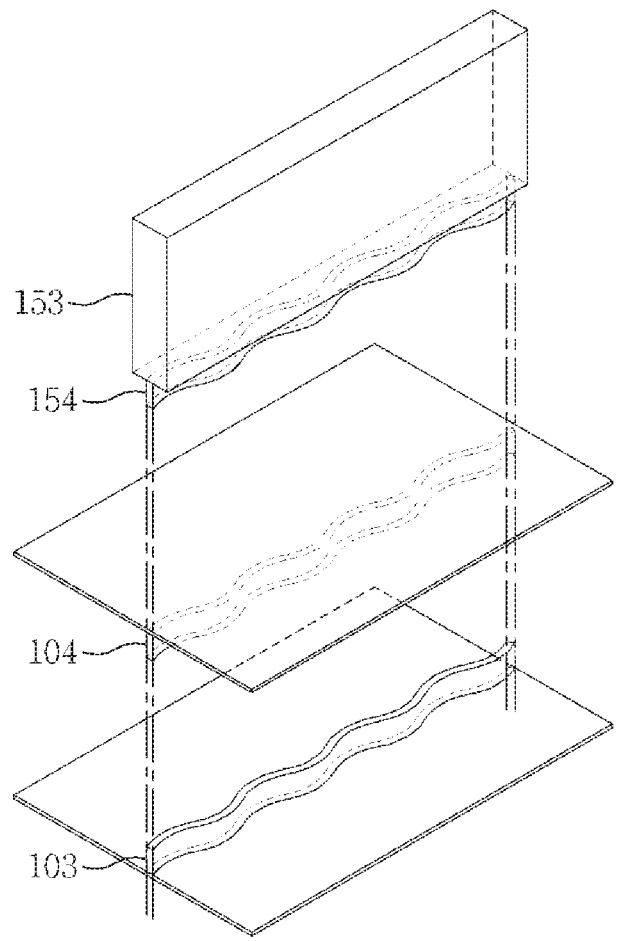
FIG. 6 is a conceptual diagram illustrating the concept of coinciding a printing pattern with a pressing pattern, which shows a condition that the pressing pattern of a protruded pressing tip, the printing pattern of the adhesive printed on an outer fabric, and the printing pattern of the adhesive printed on an inner fabric are aligned to be coincided with each other.

FIG. 6 is a conceptual diagram illustrating the concept of coinciding a printing pattern coinciding with a pressing pattern, which shows a condition that the pressing pattern of the protruded pressing tip (154), the printing pattern of the adhesive (104) printed on an outer fabric (102), and the printing pattern of the adhesive (105) printed on an inner fabric (103) are aligned to coincide with each other.

According to the embodiments of the present invention, the printing means and pressing means can be selected from a combination of devices of the same type, i.e., from a combination of printing press-pressing press, or a combination of printing roller-pressing roller, or from a combination of devices of different types, for example, a combination of printing press-pressing roller, printing roller-pressing press, or printing screen-pressing press.

Figure 7:
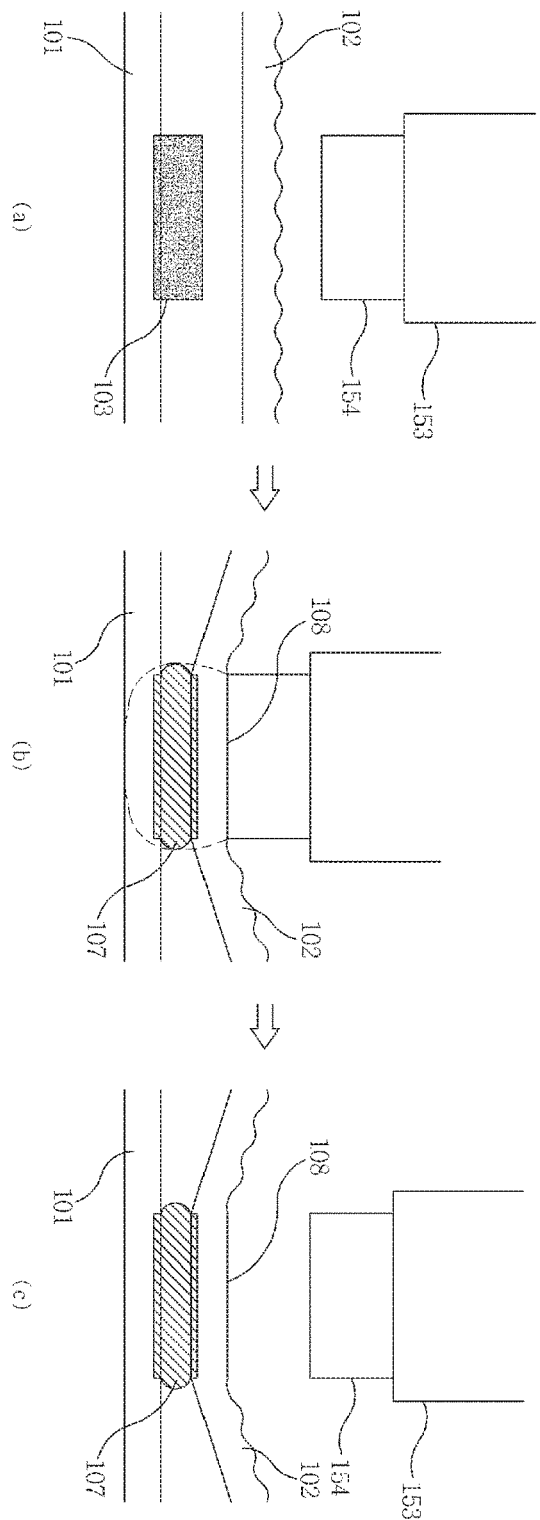
FIG. 7 is a conceptual diagram explaining the behavior of an adhesive liquid when a high frequency bonding is carried out to form a bonding pattern line at a state that the adhesive liquid is sufficiently dried to properly adjust the fluidity.

FIG. 7 is a diagram that can explain the behavior of a properly dried adhesive liquid during a high frequency bonding process and the shape and form of the resulted bonding pattern line. FIG. 7a represents a state before a high frequency bonding process, wherein the inner fabric (101) and the outer fabric (102) are laminated and the printing pattern of the adhesive liquid (103) printed on the inner fabric (101) is arranged to coincide with the pressing pattern of the pressing tip (154); FIG. 7b represents a state during the high frequency bonding process, wherein the pressing tip (154) presses the outer fabric (102) to form a pattern line (108), and the adhesive liquid is heated and carries out a curing reaction to form a bonding line (107); and FIG. 7c represents a state after the completion of the high frequency bonding process, wherein the inner fabric (101) and the outer fabric (103) are combined by a bonding line (107) issued from the adhesive, and a pattern line (108) is formed on the surface of the outer fabric (103). At this time, since the adhesive liquid was properly dried, the adhesive liquid did not flow over or spread out during the high frequency heating and pressing, and the curing reaction could proceed within the high frequency heating area. As a result, the quality (clearness, finishing) and property (adhesion power, durability) of the bonding pattern line are excellent.

Figure 8:
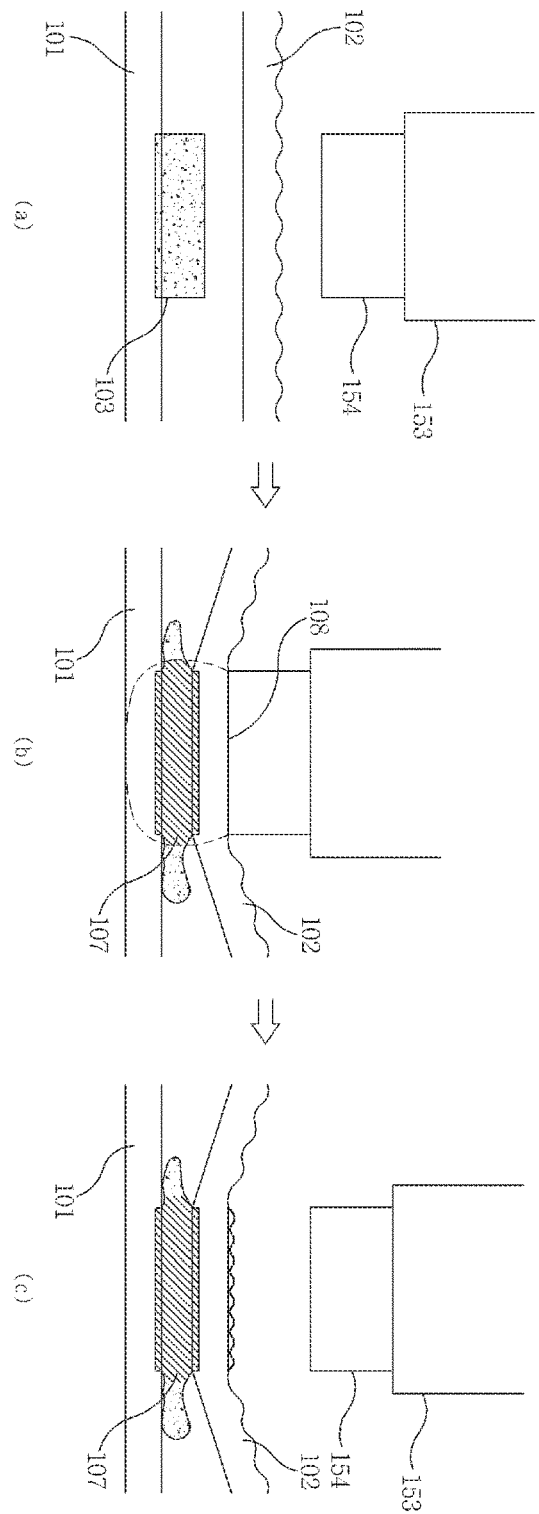
FIG. 8 is a conceptual diagram explaining the behavior of an adhesive liquid when a high frequency bonding is carried out to form a bonding pattern line at a state that the adhesive liquid has an excessive fluidity.

FIG. 8 is a diagram that can explain the behavior of an adhesive liquid that is not properly dried or has high fluidity during a high frequency bonding process and the shape and form of the resulted bonding pattern line. Drawings (a), (b) and (c) in FIG. 8 correspond to Drawings (a), (b) and (c) in FIG. 7. Since the adhesive liquid (103) printed on the inner fabric (102) has a high fluidity during the high frequency bonding (Drawing (b)), it spreads out the high frequency heating range indicated by dotted lines before carrying out a curing reaction to form a bonding line (107). When the adhesive liquid that spreads out the high frequency heating range perform a curing reaction, it adheres to the fabric outside the intended bonding line and thereby it may make the finishing of the bonding line poor; and when the adhesive does not perform a curing reaction, it remains as a unreacted adhesive liquid (the parts represented by ░ in 107) and thereby it may make the down within the compartment tangle in the future.

According to one embodiment of the present invention, said bonding means (150) can be selected from a group consisting of a high-frequency induction heating apparatus, a high-frequency dielectric heating apparatus, a microwave heating apparatus or the like, but is not limited thereto. It is preferable to employ a dielectric heating apparatus employing a high frequency of 5 MHz~50 MHz.

Figure 9:
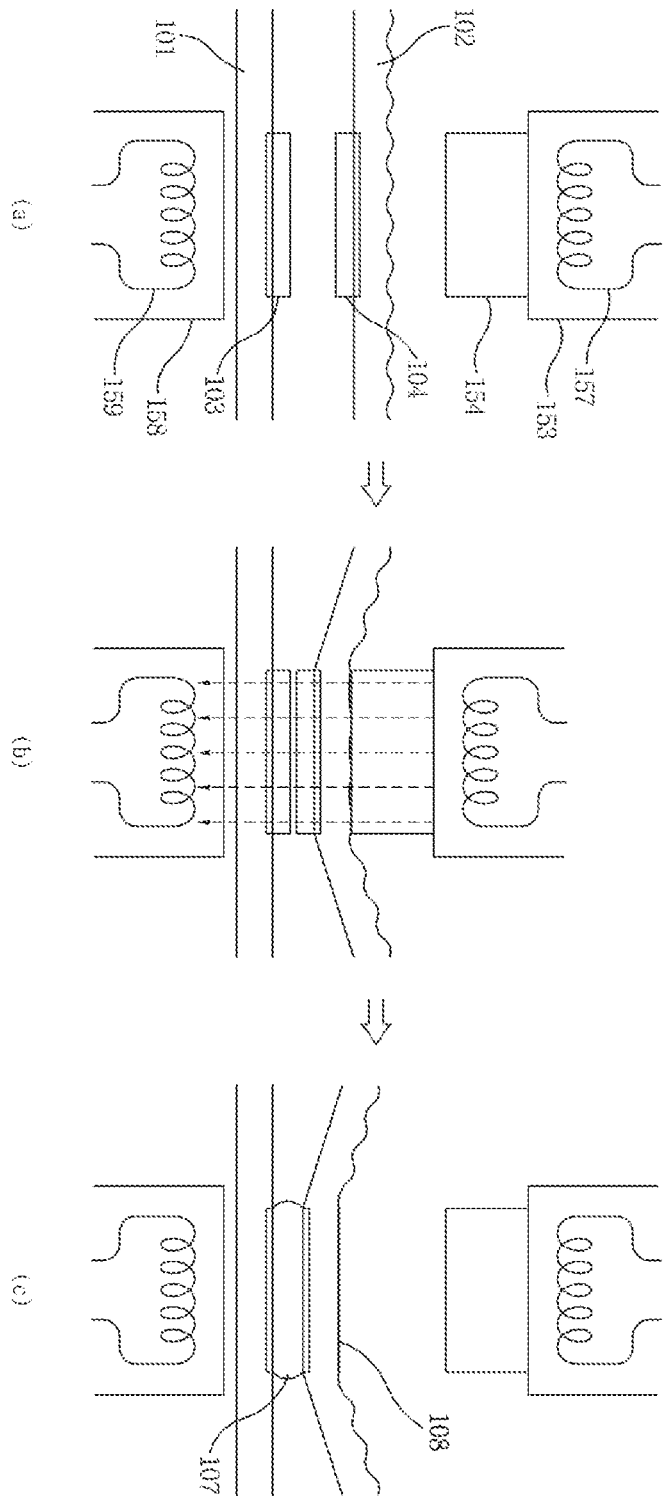
FIG. 9 is a conceptual diagram explaining a process wherein a bonding pattern line composed of an inner bonding line and a surface pattern line is formed when fabrics printed with an adhesive are subjected to a high frequency bonding (a high-frequency dielectric heating and pressing).

FIG. 9 schematically explains a high-frequency bonding process by the dielectric heating manner.

As illustrated in FIG. 9a, a high frequency circuit (159) and a high frequency circuit (159) are installed at the inside of the pressing press (153) and the support (158), respectively, and the protrusion (154) attached to the end of the pressing press (153) acts as a pressing tip.

As illustrated in FIG. 9b, in the dielectric heating manner, the adhesives (103 and 104) located within the magnetic force lines of the above two high-frequency circuit coils (157 and 159) are selectively heated by a dielectric heating. In some cases, the fabric itself located within the magnetic force lines may be heated. An irradiating of a high-frequency and a pressing of protrusion (154) in the pressing press (153) are simultaneously carried out at the same area on a fabric surface, and the formation of an inner bonding line by a curing reaction of an adhesive and the formation of a surface pattern line by a pressing with a pressing tip can be simultaneously happened. On the other hand, the induction heating manner is not a method in which an adhesive is directly heated or an adhesive generates heat, but is a method in which the heat generated inside the induction circuit is delivered or conducted to the protrusion, and the heat at the protrusion is delivered or conducted to the adhesives inside the fabrics to cause a curing reaction of the adhesives.

As illustrated in FIG. 9c, when the adhesives (103 and 104) printed in a predetermined printing pattern are heated and pressed with a heating tip (154) having a pressing pattern that is the same as the printing pattern so that they are coincided with each other, it is possible to obtain, in the same time and in the same pattern, a bonding line (107) having an excellent adhesiveness and a pattern line (108) having an excellent, as in the high-frequency induction heating manner.

In the high-frequency dielectric heating method, it is necessary to select a frequency number of the high frequency to be applied, an irradiation time and an electric power in consideration of a desired heating temperature of an adhesive and its dielectric heating constant.

If a bonding process is carried out by a high frequency dielectric heating method in a state that the printing pattern and the pressing pattern are not coincide with each other, the adhesive located out of the range of magnetic force line will not be heated and thus may not proceed with a curing. Even if the adhesive out of the range of magnetic force line may proceed with a curing, the adhesive will not be subjected to a pressing. Therefore, there will be resulted in an unevenness of a bonding line between the fabrics and an inconsistency of the bonding line and the pattern line, which would cause that a pattern line finishing may be poor, and the inner fabric and the outer fabric may not combined with each other at some parts in a pattern line.

Meanwhile, when a bonding means with a high frequency induction heating manner is employed, the protrusion acts as a pressing heating tip, and the adhesive will be heated by the heat which is generated at the pressing heating tip and then delivered through the fabric. The pressing heating tip hot-presses, along its pressing pattern, the laminated fabrics of which printing patterns have been coincided with each other. If the printing pattern and the pressing pattern are the same and hot-pressed in a state that they are coincided with each other, a bonding line and a pattern line are simultaneously formed in the same pattern shape between the fabrics and on the fabric surface, respectively, wherein the adhesive is cured to form the bonding line between the fabrics along the pressing pattern. In such case, the bonding strength of the bonding line (i.e., compartment separation line) and the finishing quality of the pattern line will be very excellent. In the high frequency induction heating manner, it is necessary to properly control the temperature of the pressing heating tip and pressing time so that the temperature of the fabric surface does not get too high.

If a high frequency bonding is carried out in a state that the printing pattern and the pressing pattern are not coincided with each other, the adhesive located outside the area of the heating pressing tip may not go through a curing reaction or may not be pressed even if it goes through the curing reaction. As similar to the above stated case, therefore, due to the unevenness of the bonding line between the fabrics and the inconsistency between the bonding line and the pattern line, the pattern line finishing may be poor, and the inner fabric and outer fabric may not bond to each other partially in the pattern lines.

According to a preferable embodiment of the present invention, it is preferable that the printing pattern of the adhesive liquid is substantially the same with the pressing pattern of the pressing tip in a high frequency heating roller or press, and the difference in width thereof should be within 20%, particularly within 10%, and preferably within 5%. It may be preferable that the pressing pattern of a pressing tip is slightly smaller than the printing pattern of an adhesive liquid in order to form a clearer pattern line and more excellent finishing of the pattern line.

In the embodiment of the present invention, the raw material of rollers and presses is not particularly important and may be selected from a group consisting of any materials which can be commonly employed in the field of the present invention, and selected from, for example, metal, alloy or ceramic.

The protrusion of a pressing pattern formed on a high-frequency heating roller may be embossed by a relief manner or attached by a casting or welding manner.

INDUSTRIAL APPLICABILITY

The device of the present invention can be industrially used in the industry of clothing, bedding and sewing, and particularly, can be usefully utilized in the field of producing down products such as down jacket, down bedding, etc.

DESCRIPTION ON REFERENCE NUMERALS 101, 102: an inner fabric and an outer fabric
103, 104: adhesive
107, 108: a bonding line (cured adhesive) and its pattern line
110: an introducing means
111, 112: an inner fabric roll and an outer fabric roll
120: a printing means
121, 122: an inner fabric printing device an outer fabric printing device
123, 125: a printing press and a printing roller (main roller)
124: grooves (intaglio)
127, 129: a release roller and a guide knife
130: a drying means
140: a laminating means
142: a variable roller
143: a laminating roller
150: a bonding means
153, 155: a pressing press and a pressing roller
154: protrusion (pressing tip)
160: a winding means
161: a double fabric
162: a double fabric winding roll
230: an adhering device part (prior art)
232: a bonding device part (prior art)
234: a drying device part (prior art)

What is claimed is:

1. A device for the preparation of a double fabric for down products, which comprises a printing means, a drying means, a laminating means and a bonding means as follows:
a printing means which is provided with a printing apparatus carved with a predetermined printing pattern and which can print an adhesive in said printing pattern on a fabric;
a drying means which can dry or fix the adhesive so that the adhesive printed on the fabric is not transferred during a laminating process;
a laminating means which can stack and laminate the fabrics on which an adhesive is printed; and
a bonding means which is provided with a pressing means on which a protrusion having a predetermined pressing pattern is formed and which can bond fabrics with the adhesive by pressing with said pressing means and high-frequency heating to cure the adhesive;
wherein said printing pattern and the pressing pattern are the same in pattern (shape), can be overlapped on the basis of the center line and have a difference in size (width) of 20% or less.

2. The device of manufacturing a down product according to claim 1, characterized in that said printing means can selected from a group consisting of a stamping printing means, a pressing press printing means, a roller printing means or a screen printing means.

3. The device of manufacturing a down product according to claim 2, characterized in that, a groove having a predetermined pattern is formed in a depth of 0.5~10 mm on said printing press or roller.

4. The device of manufacturing a down product according to claim 1, characterized in that said printing means is provided with both of an adhesive printing means for inner fabric and an adhesive printing means for outer fabric.

5. The device of manufacturing a down product according to claim 1, characterized in that said drying means is a hot wind dryer or a tenter.

6. The device of manufacturing a down product according to claim 1, characterized in that said laminating means further comprises a first alignment means (the means for adjusting the fabric location) to adjust the relative positions between the location of the adhesive printing pattern at the upper fabric and the location of the adhesive printing pattern at the lower fabric.

7. The device of manufacturing a down product according to claim 1, characterized in that said bonding means further comprises pressing means which can be selected from a pressing press or roller.

8. The device of manufacturing a down product according to claim 7, characterized in that, a protrusion having a predetermined pattern is formed in a height of 5~20 mm on the surface of said pressing press or roller.

9. The device of manufacturing a down product according to claim 1, characterized in that said bonding means is a dielectric heating apparatus employing a high frequency of 5 MHz~50 MHz.

10. The device of manufacturing a down product according to claim 1, characterized in that said bonding means comprise a second alignment means which can control the position of the adhesive printed on a fabric or the position of the protrusion to adjust their relative positions.

11. The device of manufacturing a down product according to claim 1, characterized in that said second alignment means can adjust and overlap the relative positions of said printing pattern and pressing pattern by coinciding the center line of the printing pattern of the adhesive with the center line of the pressing pattern of the protrusion.

12. The device of manufacturing a down product according to claim 1, characterized in that said printing pattern of the printing means and said pressing pattern of the pressing means have a width of 1~10 mm, respectively.

* * * * *